United States Patent [19]

Bluhm et al.

[11] Patent Number: 6,073,231

[45] Date of Patent: *Jun. 6, 2000

[54] PIPELINED PROCESSOR WITH MICROCONTROL OF REGISTER TRANSLATION HARDWARE

[75] Inventors: Mark Bluhm, Carrollton; Mark W. Hervin, Dallas, both of Tex.

[73] Assignee: Via-Cyrix, Inc., Richardson, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/819,838

[22] Filed: Mar. 17, 1997

Related U.S. Application Data

[63] Continuation of application No. 08/698,215, Aug. 14, 1996, abandoned, which is a continuation of application No. 08/526,126, Sep. 8, 1995, abandoned, which is a continuation of application No. 08/139,597, Oct. 18, 1993, abandoned.

[51] Int. Cl.[7] .......................................................... G06F 9/38
[52] U.S. Cl. ........................... 712/218; 712/206; 712/211; 712/214; 712/215; 712/217
[58] Field of Search ..................................... 712/206, 211, 712/214, 215, 217, 218

[56] References Cited

U.S. PATENT DOCUMENTS

| | | |
|---|---|---|
| 4,493,020 | 1/1985 | Kim et al. . |
| 4,736,288 | 4/1988 | Shintani et al. . |
| 4,829,425 | 5/1989 | Bain, Jr. et al. . |
| 4,853,849 | 8/1989 | Bain, Jr. et al. . |
| 4,916,606 | 4/1990 | Yamaoka et al. . |
| 4,992,938 | 2/1991 | Cocke et al. . |
| 5,072,372 | 12/1991 | Schmidt . |
| 5,165,038 | 11/1992 | Beard et al. . |
| 5,197,132 | 3/1993 | Steely, Jr. et al. . |
| 5,226,126 | 7/1993 | McFarland et al. . |
| 5,226,164 | 7/1993 | Nadas et al. . |

FOREIGN PATENT DOCUMENTS

| | | |
|---|---|---|
| 0301220 | 2/1989 | European Pat. Off. . |
| 0352103 | 1/1990 | European Pat. Off. . |
| 0399762 | 11/1990 | European Pat. Off. . |
| 0420457 | 4/1991 | European Pat. Off. . |
| 0514763 | 11/1992 | European Pat. Off. . |
| 0529913 | 3/1993 | European Pat. Off. . |
| 2263565 | 7/1993 | United Kingdom . |
| WO-A-93/ 20505 | 10/1993 | WIPO . |

OTHER PUBLICATIONS

Sohi, "Instruction Issue Logic for High–Performance, interruptible, Multiple Functional Unit, Pipelined Computers"; IEEE Transactions on Computers, vol. 39, No. 3, Mar. 1990, pp. 349–359.

Acosta; "An Instruction Issuing Approach to Enhancing Performance In Multiple Functional Unit Processors".

IEEE Transactions on Computers, vol. c–35, No. 9, Sept. 1986, pp. 815–828.

Dwyer; "A Fast Instruction Dispatch Unit for Multiple and Out–of–Sequence Issuances"; EE–CEG–87–15, pp. 1–118 Figs: 1–9.

Val Popescu et al; "The Metaflow Architecture"; IEEE Micro, Jun. 1991; pp. 10–13 and 63–73.

Proceedings COMPCON Spring '93, "The PowerPC 601 microprocessor", Feb. 1993, San Francisco, US, pp109–116.

IBM Technical Disclosure Bulletin, "Collision Vector Table Logical Address, Physical Address, . . . ", vol. 36, No. 09B, Sep. 1993 (pp. 381–382).

*Primary Examiner*—Krisna Lim
*Attorney, Agent, or Firm*—Carr & Ferrell LLP

[57] ABSTRACT

A microprocessor comprises one or more instruction pipelines having a plurality of stages for processing a stream of instructions, with one or more of said instructions referencing a set of logical registers. A plurality of physical registers are allocated to store data associated with the logical registers by register translation circuitry. The register translation circuitry is selectively controlled by the microcode or by hardware signals generated by one or more of the stages.

7 Claims, 8 Drawing Sheets

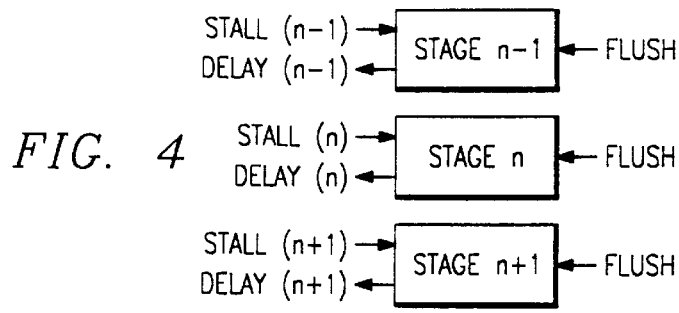
FIG. 4
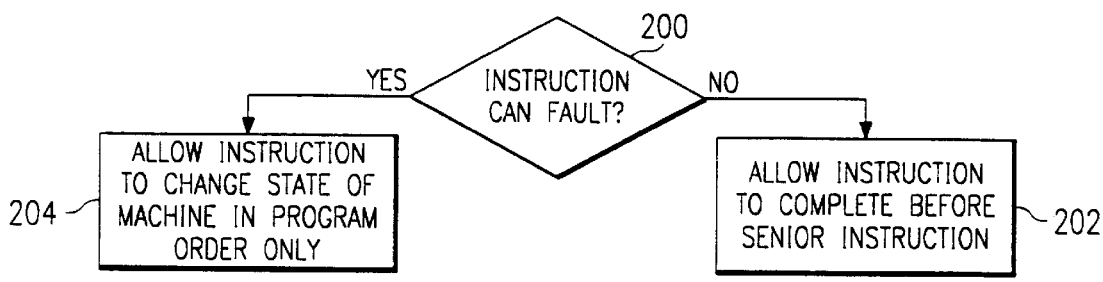
FIG. 5
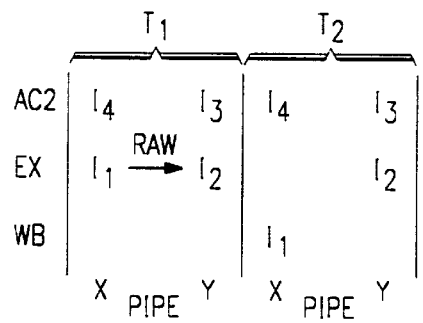 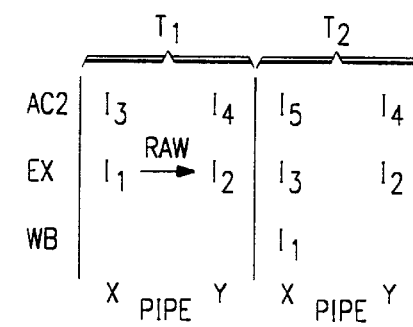
FIG. 6a          FIG. 6b
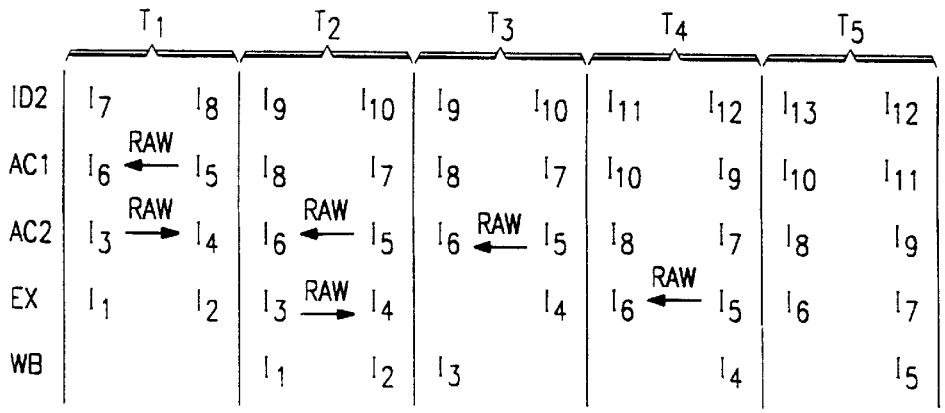
FIG. 7

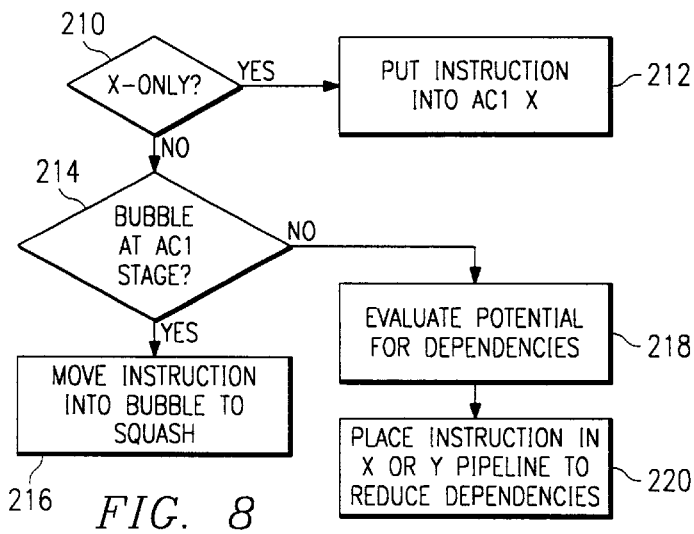

FIG. 8

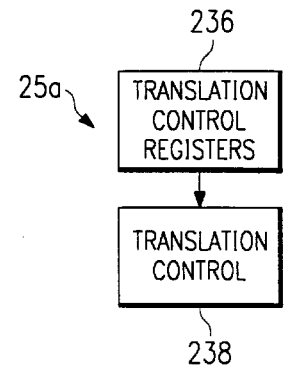

FIG. 9

| | Physical Register 0 | Physical Register 1 | Physical Register 2 | | Physical Register 31 | |
|---|---|---|---|---|---|---|
| Logical ID Reg | LogID[2:0] | LogID[5:3] | LogID[8:6] | • • • | LogID[98:96] | 240 |
| Size Reg | Size[1:0] | Size[3:2] | Size[5:4] | • • • | Size[65:64] | 242 |
| Current Reg | Current[0] | Current[1] | Current[2] | • • • | Current[31] | 244 |
| Pending Reg | Pending[0] | Pending[1] | Pending[2] | • • • | Pending[31] | 246 |
| Chkpnt 0 Reg | Chkpnt0[0] | Chkpnt0[1] | Chkpnt0[2] | • • • | Chkpnt0[31] | |
| Chkpnt 1 Reg | Chkpnt1[0] | Chkpnt1[1] | Chkpnt1[2] | • • • | Chkpnt1[31] | |
| Chkpnt 2 Reg | Chkpnt2[0] | Chkpnt2[1] | Chkpnt2[2] | • • • | Chkpnt2[31] | 248 |
| Chkpnt 3 Reg | Chkpnt3[0] | Chkpnt3[1] | Chkpnt3[2] | • • • | Chkpnt3[31] | |
| AC1x Reg | AC1x[0] | AC1x[1] | AC1x[2] | • • • | AC1x[31] | |
| AC1y Reg | AC1y[0] | AC1y[1] | AC1y[2] | • • • | AC1y[31] | |
| AC2x Reg | AC2x[0] | AC2x[1] | AC2x[2] | • • • | AC2x[31] | |
| AC2y Reg | AC2y[0] | AC2y[1] | AC2y[2] | • • • | AC2y[31] | 250 |
| EXx Reg | EXx[0] | EXx[1] | EXx[2] | • • • | EXx[31] | |
| EXy Reg | EXy[0] | EXy[1] | EXy[2] | • • • | EXy[31] | |
| Reg Busy Reg | RegBusy[0] | RegBusy[1] | RegBusy[2] | • • • | RegBusy[31] | 252 |

FIG. 10

FIG. 15a BEFORE FORWARDING

| MOV | 0 | 0 |  |  | 1 |  |  |  |
|---|---|---|---|---|---|---|---|---|
|  | SRC0 | WP0 | SRC1 | WP1 | DES0 | DES1 |  |  |
| ADD | 1 | 1 | 2 | 0 | 3 |  |  |  |
|  | SRC0 | WP0 | SRC1 | WP1 | DES0 | DES1 |  |  |

FIG. 15b AFTER FORWARDING

| MOV | 0 | 0 |  |  | 1 |  |  |  |
|---|---|---|---|---|---|---|---|---|
|  | SRC0 | WP0 | SRC1 | WP1 | DES0 | DES1 |  |  |
| ADD | 0 | 0 | 2 | 0 | 3 |  |  |  |
|  | SRC0 | WP0 | SRC1 | WP1 | DES0 | DES1 |  |  |

FIG. 16a BEFORE FORWARDING

| ADD | 0 | 0 | 1 | 0 | 2 |  |  |  |
|---|---|---|---|---|---|---|---|---|
|  | SRC0 | WP0 | SRC1 | WP1 | DES0 | DES1 | WBX | WBY |
| MOV | 2 | 1 |  |  | 3 |  |  |  |
|  | SRC0 | WP0 | SRC1 | WP1 | DES0 | DES1 | WBX | WBY |

FIG. 16b AFTER FORWARDING

| ADD | 0 | 0 | 1 | 0 | 2 |  |  |  |
|---|---|---|---|---|---|---|---|---|
|  | SRC0 | WP0 | SRC1 | WP1 | DES0 | DES1 | WBX | WBY |
| MOV |  |  |  |  | 3 |  | 1 |  |
|  | SRC0 | WP0 | SRC1 | WP1 | DES0 | DES1 | WBX | WBY |

PIPELINED PROCESSOR WITH MICROCONTROL OF REGISTER TRANSLATION HARDWARE

The present application is a file wrapper continuation of application Ser. No. 08/698,215, filed Aug. 14, 1996, now abandoned, which was a file wrapper continuation of application Ser. No. 08/526,126, filed Sep. 8, 1995, now abandoned, which was a file wrapper continuation of application Ser. No. 08/139,597, filed Oct. 18, 1993, now abandoned.

CROSS REFERENCE TO RELATED APPLICATIONS

This application is related to commonly-assigned U.S. Pat. No. 5,584,009 to Garibay et al, titled "System and Method of Retiring Store Data From a Write Buffer", and commonly assigned U.S. Ser. No. 08/138,855 to Hervin et al, titled "Microprocessor With Single Clock Instruction Decode Architecture Employing Single Microrom", filed concurrently herewith, both of which are incorporated by reference herein.

TECHNICAL FIELD OF THE INVENTION

This invention relates in general to microprocessors and more particularly to a pipelined microprocessor architecture.

BACKGROUND OF THE INVENTION

In the design of a microprocessor, instruction throughput, i.e., the number of instructions executed per second, is of primary importance. The number of instructions executed per second may be increased by various means. The most straightforward technique for increasing instruction throughput is by increasing frequency at which the microprocessor operates. Increased operating frequency, however, is limited by fabrication techniques and also results in the generation of excess heat.

Thus, modern day microprocessor designs are focusing on increasing the instruction throughput by using design techniques which increase the average number of instructions executed per clock cycle period. One such technique for increasing instruction throughput is "pipelining." Pipelining techniques segment each instruction flowing through the microprocessor into several portions, each of which can be handled by a separate stage in the pipeline. Pipelining increases the speed of a microprocessor by overlapping multiple instructions in execution. For example, if each instruction could be executed in six stages, and each stage required one clock cycle to perform its function, six separate instructions could be simultaneously executed (each executing in a separate stage of the pipeline) such that one instruction was completed on each clock cycle. In this ideal scenario, the pipelined architecture would have an instruction throughput which was six times greater than the non-pipelined architecture, which could complete one instruction every six clock cycles.

A second technique for increasing the speed of a microprocessor is by designing it to be a "superscalar." In a superscalar architecture, more than one instruction is issued per clock cycle. If no instructions were dependent upon other instructions in the flow, the increase in instruction throughput would be proportional to the degree of scaleability. Thus, if an architecture were superscalar to degree 2 (meaning that two instructions issued upon each clock cycle), then the instruction throughput in the machine would double.

A microprocessor may be both superpipelined (an instruction pipeline with many stages is referred to as "superpipelined") and superscalar to achieve a high instruction throughput. However, the operation of such a system in practice is far from the ideal situation where each instruction can be neatly executed in a given number of pipe stages and where the execution of instructions is not interdependent. In actual operation, instructions have varying resource requirements, thus creating interruptions in the flow of instructions through the pipeline. Further, the instructions typically have interdependencies; for example, an instruction which reads the value of a register is dependent on a previous instruction which writes the value to that same register—the second instruction cannot execute until the first instruction has completed its write to the register.

Consequently, while superpipelining and superscalar techniques can increase the throughput of a microprocessor, the instruction throughput is highly dependent upon the implementation of the superpipelined, superscalar architecture. One particular problem is controlling the flow of instructions in the pipeline increase the instruction throughput without increasing the frequency of the microprocessor. The efficiency of a superpipelined, superscalar machine is diminished as dependencies, or other factors, cause various stages to be inactive during operation of the microprocessor.

Therefore, a need has arisen for a microprocessor architecture with efficient control of the flow of instructions therein.

SUMMARY OF THE INVENTION

The microprocessor of the present invention comprises one or more instruction pipelines having a plurality of stages for processing a stream of instructions, with one or more of said instructions referencing a set of logical registers. A plurality of physical registers are allocated to store data associated with the logical registers by register translation circuitry. The register translation circuitry is selectively controlled by the microcode or by hardware signals generated by one or more of the stages.

The present invention provides significant advantages over the prior art. The register translation circuitry can be used during processing of the instructions during various stages under hardware control or by the execution stage during execution of the instruction. Hence, hardware is conserved.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates a block diagram of the control mechanism for controlling the flow of instructions through the pipeline unit;

FIG. 5 illustrates a flow diagram illustrating out-of-order completion of instructions;

FIGS. 6a, 6b and 7 illustrate a flow of instruction through the pipeline using pipe switching;

FIG. 8 illustrates a flow diagram describing the method of pipe switching;

FIG. 9 illustrates a functional block diagram of the register translation unit;

FIG. 10 illustrates the control registers used in the register translation unit;

FIGS. 15*a* and 15*b* illustrate operand forwarding;

FIGS. 16*a* and 16*b* illustrate result forwarding;

DETAILED DESCRIPTION OF THE PREFERRED EMBODIMENTS

The detailed description of an exemplary embodiment of the microprocessor of the present invention is organized as follows:

1. Exemplary Processor System
    1.1. Microprocessor
    1.2. System
2. Generalized Pipeline Flow
3. Pipeline Control
    3.1. Generalized Stall Control
    3.2. Pipe Switching
    3.3. Multi-box Instructions
    3.4. Exclusive Instructions
4. In order Passing/Out-of-Order Completion of Instructions
5. Pipe Switching
6. Issuing Instructions Without Regard to Dependencies
7. Multi-threaded EX Operation
8. Register Translation Unit
    8.1. Register Translation Overview
    8.2. Translation Control Registers
    8.3. Register Allocation
    8.4. Instructions With Two Destinations
    8.5. Checkpointing Registers for Speculative Branch Path Execution
    8.6. Recovery from Exceptions
    8.7. Microcontrol of the Register Translation Unit and Renaming
    8.8. Register ID Translation and Hazard Detection
9. Forwarding
10. Conclusion This organizational table and the corresponding headings used in this detailed description, are provided for the convenience of reference only. Detailed description of conventional or known aspects of the microprocessor are omitted as to not obscure the description of the invention with unnecessary detail.

1. Exemplary Processor System

Figure 1A:
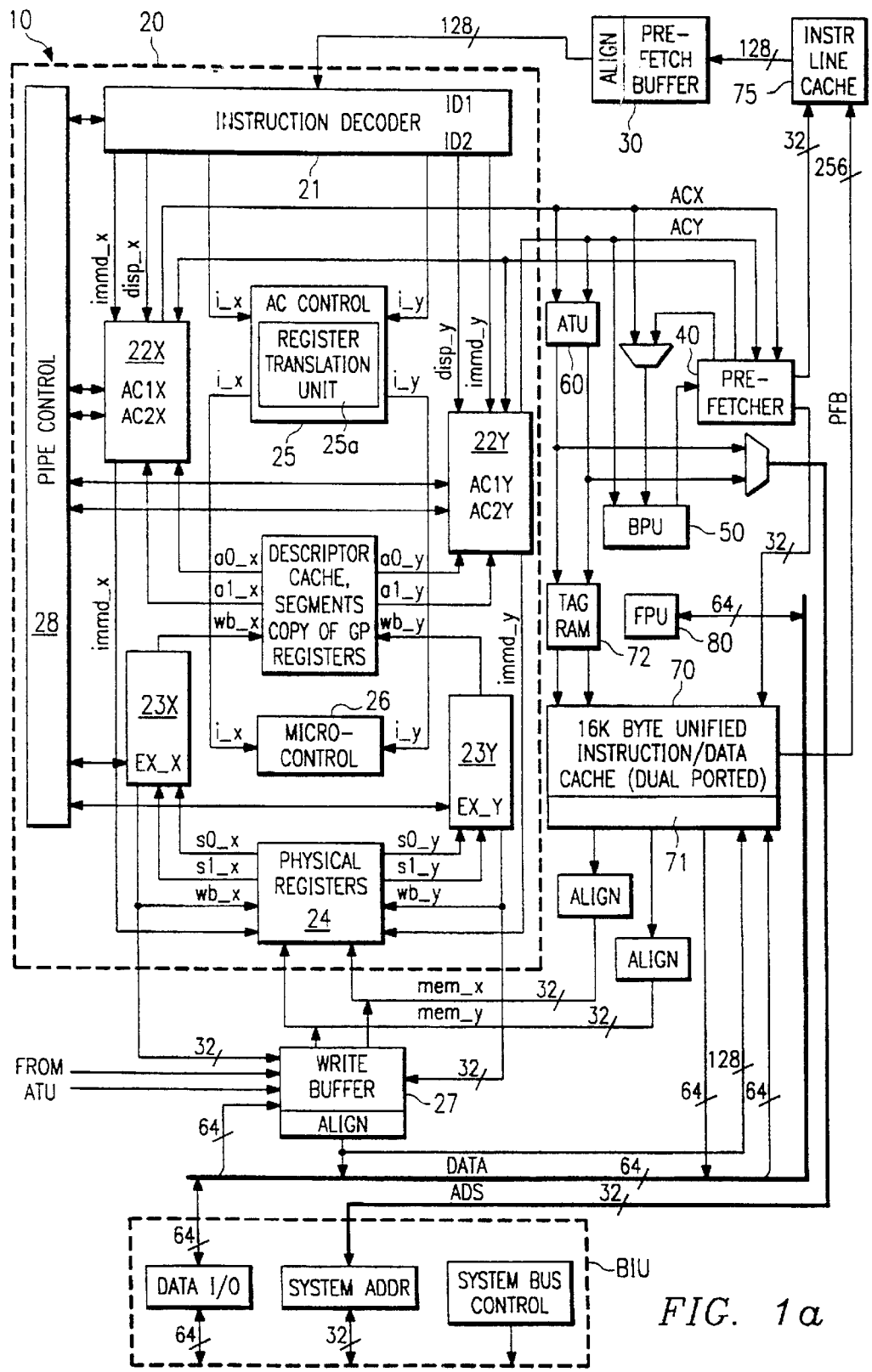
FIG. 1a illustrates a block diagram of the overall microprocessor.
Figure 1B:
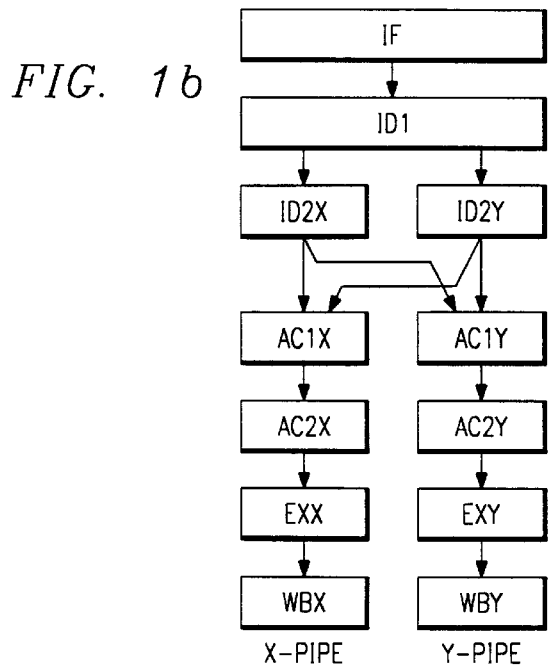
FIG. 1b illustrates a generalized block diagram of the instruction pipeline unit.
Figure 2:
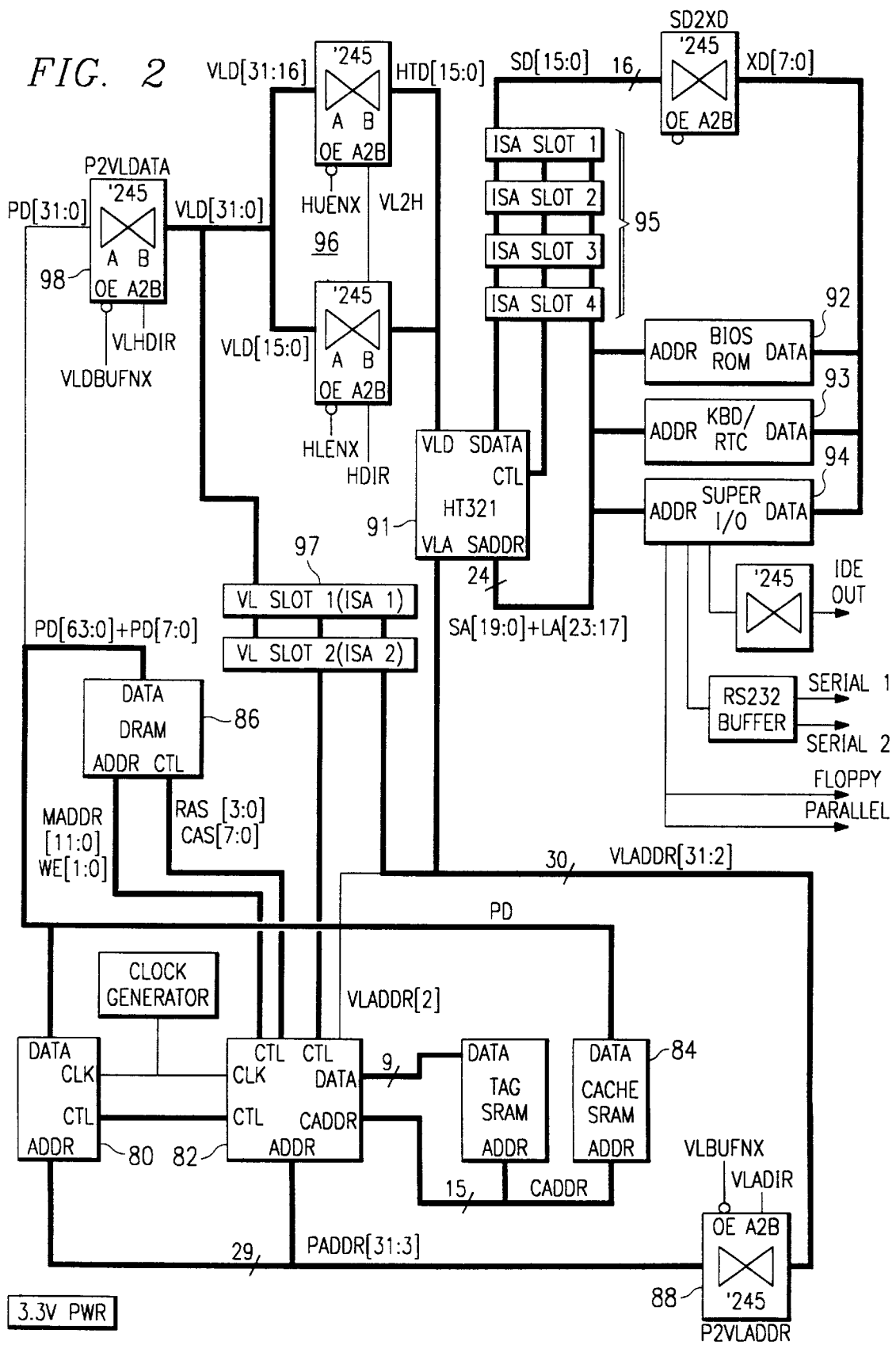
FIG. 2 is a block diagram of an exemplary computer system.

The exemplary processor system is shown in FIGS. 1*a* and 1*b*, and FIG. 2. FIGS. 1*a* and 1*b* respectively illustrate the basic functional blocks of the exemplary superscalar, superpipelined microprocessor along with the pipe stages of the two execution pipelines. FIG. 2 illustrates an exemplary processor system (motherboard) design using the microprocessor.

1.1. Microprocessor

Referring to FIG. 1*a*, the major sub-blocks of a microprocessor 10 include: (a) CPU core 20, (b) prefetch buffer 30, (c) prefetcher 40, (d) BPU (branch processing unit) 50, (e) TLB (translation lookaside buffer) 60, and (f) unified 16 Kbyte code/data cache 70, including TAG RAM 72. A 256 byte instruction line cache 75 provides a primary instruction cache to reduce instruction fetches to the unified cache, which operates as a secondary instruction cache. An onboard floating point unit (FPU) 80 executes floating point instructions issued to it by the CPU core 20.

The microprocessor uses internal 32-bit address and 64-bit data buses ADS and DBS. A 256 bit (32 byte) prefetch bus PFB, corresponding to the 32 byte line size of the unified cache 70 and the instruction line cache 75, allows a full line of 32 instruction bytes to be transferred to the instruction line cache in a single clock. Interface to external 32 bit address and 64 bit data buses is through a bus interface unit (BIU) 90.

The unified cache 70 is 4-way set associative (with a 4 k set size), using a pseudo-LRU replacement algorithm, with write-through and write-back modes. It is dual ported (through banking) to permit two memory accesses (data read, instruction fetch, or data write) per clock. The instruction line cache is a fully associative, lookaside implementation (relative to the unified cache), using an LRU replacement algorithm.

The FPU 80 includes a load/store stage with 4-deep load and store queues, a conversion stage (32-bit to 80-bit extended format), and an execution stage. Loads are controlled by the CPU core 20, and cacheable stores are directed through write buffers 27 (i.e., a write buffer is allocated for each floating point store operation).

The CPU core 20 is a superscalar design with two execution pipes X and Y. It incudes an instruction decoder 21, address calculation units 22X and 22Y, execution units 23X and 23Y, and a register file 24 with 32 32-bit registers. An AC control unit 25 includes a register translation unit 25*a* with a register scoreboard and register renaming hardware. A microcontrol unit 26, including a microsequencer and microROM, provides execution control.

Writes from CPU core 20 are queued into twelve 32 bit write buffers 27—write buffer allocation is performed by the AC control unit 25. These write buffers provide an interface for writes to the unified cache—non-cacheable writes go directly from the write buffers to external memory. The write buffer logic supports optional read sourcing and write gathering.

A pipe control unit 28 controls instruction flow through the execution pipes, including keeping the instructions in order until it is determined that an instruction will not cause an exception, squashing bubbles in the instruction stream, and flushing the execution pipes behind branches that are mispredicted and instructions that cause an exceptions. For each stage, the pipe control unit keeps track of which execution pipe contains the earliest instruction, and provides a stall output and receives a delay input.

Referring to FIG. 1*b*, the microprocessor has seven-stage X and Y execution pipelines: instruction fetch IF, two instruction decode stages ID1 and ID2, two address calculation stages AC1 and AC2, execution EX, and write-back WB. Note that the complex instruction decode ID and address calculation AC pipe stages are superpipelined.

The IF stage provides a continuous code stream into the CPU core 20. The prefetcher 40 fetches 16 bytes of instruction data into the prefetch buffer 30 from either the (primary) instruction line cache 75 or the (secondary) unified cache 70. BPU 50 is accessed with the prefetch address, and supplies target addresses to the prefetcher for predicted changes of flow, allowing the prefetcher to shift to a new code stream in one clock.

The decode stages ID1 and ID2 decode the variable length X86 instruction set. The instruction decoder 22 retrieves 16 bytes of instruction data from the prefetch buffer 30 each clock. In ID1, the length of two instructions is decoded (one each for the X and Y execution pipes) to obtain the X and Y instruction pointers—a corresponding X and Y bytes-used signal is sent back to the prefetch buffer (which then increments for the next 16 byte transfer). Also in ID1, certain instruction types are determined, such as changes of flow, and immediate and/or displacement operands are separated. The ID2 stage completes decoding the X and Y instructions, generating entry points for the microROM and decoding addressing modes and register fields.

During the ID stages, the optimum pipe for executing an instruction is determined, and the instruction is issued into that pipe. Pipe switching allows instructions to be switched from ID2x to AC1y, and from ID2y to AC1x. For the exemplary embodiment, certain instructions are issued only into the X pipeline: change of flow instructions, floating point instructions, and exclusive instructions. Exclusive instructions include: any instruction that may fault in the EX pipe stage and certain types of instructions such as protected mode segment loads, string instructions, special register access (control, debug, test), Multiply/Divide, Input/Output, PUSHA/POPA, and task switch. Exclusive instructions are able to use the resources of both pipes because they are issued alone from the ID stage (i.e., they are not paired with any other instruction). Except for these issue constraints, any instructions can be paired and issued into either the X or Y pipe.

The address calculation stages AC1 and AC2 calculate addresses for memory references and supply memory operands. The AC1 stage calculates two 32 bit linear (three operand) addresses per clock (four operand addresses, which are relatively infrequent, take two clocks). During this pipe stage, data dependencies are also checked and resolved using the register translation unit 25a (register scoreboard and register renaming hardware)—the 32 physical registers 24 are used to map the 8 general purpose programmer visible logical registers defined in the X86 architecture (EAX, EBX, ECX, EDX EDI, ESI, EBP, ESP). During the AC2 stage, the register file 26 and the unified cache 70 are accessed with the physical address (for cache hits, cache access time for the dual ported unified cache is the same as that of a register, effectively extending the register set)—the physical address is either the linear address, or if address translation is enabled, a translated address generated by the TLB 60.

Translated addresses are generated by the TLB from the linear address using information from page tables in memory and workspace control registers on chip. The unified cache is virtually indexed and physically tagged to permit, when address translation is enabled, set selection with the untranslated address (available at the end of AC1) and, for each set, tag comparison with the translated address from the TLB (available early in AC2). Checks for any segmentation and/or address translation violations are also performed in AC2.

Instructions are kept in program order until it is determined that they will not cause an exception. For most instructions, this determination is made during or before AC2—floating point instructions and certain exclusive instructions may cause exceptions during execution. Instructions are passed in order from AC2 to EX (or in the case of floating point instructions, to the FPU)—because integer instructions that may still cause an exception in EX are designated exclusive, and therefore are issued alone into both execution pipes, handling exceptions in order is ensured.

The execution stages EXx and EXy perform the operations defined by the instruction. Instructions spend a variable number of clocks in EX i.e., they are allowed to execute out of order (out of order completion). Both EX stages include adder, logical, and shifter functional units, and in addition, the EXx stage contains multiply/divide hardware.

The write back stage WB updates the register file 24, condition codes, and other parts of the machine state with the results of the previously executed instruction.

The microprocessor 10 supports speculative execution in the case of both branch and floating point instructions. That is, instructions following either a floating point instruction, or a branch for which the BPU 50 has predicted the direction (taken or not taken), are speculatively allowed to proceed in the execution pipelines and complete execution. If a floating point instruction faults (which may be tens or even hundreds of clocks after being issued to the FPU) or if a branch is mispredicted (which will not be known until the EX or WB stage for the branch), then the execution pipeline must be repaired to the point of the faulting or mispredicted instruction (i.e., the execution pipeline is flushed behind that instruction), and instruction fetch restarted.

Pipeline repair is accomplished by creating checkpoints of the machine state at each pipe stage as a floating point or predicted branch instruction enters that stage. For these checkpointed instructions, all resources (programmer visible registers, instruction pointer, condition code register) that can be modified by succeeding speculatively issued instructions are checkpointed. If a checkpointed floating point instruction faults or a checkpointed branch is mispredicted, the execution pipeline is flushed behind the checkpointed instruction—for floating point instructions, this will typically mean flushing the entire execution pipeline, while for a mispredicted branch there may be a paired instruction in EX and two instructions in WB that would be allowed to complete.

For the exemplary microprocessor 10, the principle constraints on the degree of speculation are: (a) speculative execution is allowed for only up to four floating point or branch instructions at a time (i.e., the speculation level is maximum 4), and (b) a write or floating point store will not complete to the cache or external memory until the associated branch or floating point instruction has been resolved (i.e., the prediction is correct, or floating point instruction does not fault).

Additional disclosure on the write buffer 27, speculative execution and the microsequencer may be found in commonly-assigned U.S. Pat. No. 5,584,009 to Garibay et al, titled "System and Method of Retiring Store Data From a Write Buffer", and commonly assigned U.S. Ser. No. 08/138,855 to Hervin et al, titled "Microprocessor With Single Clock Instruction Decode Architecture Employing Single Microrom", filed concurrently herewith, both of which are incorporated by reference herein.

1.2. System

Referring to FIG. 2, for the exemplary embodiment, microprocessor 80 is used in a processor system that includes a single chip memory and bus controller 82. The memory/bus controller 82 provides the interface between the microprocessor and the external memory subsystem—level two cache 84 and main memory 86—controlling data movement over the 64 bit processor data bus PD (the data path is external to the controller which reduces its pin count and cost).

Controller 82 interfaces directly to the 32-bit address bus PADDR, and includes a one bit wide data port (not shown) for reading and writing registers within the controller. A bidirectional isolation buffer 88 provides an address interface between microprocessor 80 and VL and ISA buses.

Controller 82 provides control for the VL and ISA bus interface. A VL/ISA interface chip 91 (such as an HT321) provides standard interfaces to a 32 bit VL bus and a 16 bit ISA bus. The ISA bus interfaces to BIOS 92, keyboard controller 93, and I/O chip 94, as well as standard ISA slots 95. The interface chip 91 interfaces to the 32 bit VL bus through a bidirectional 32/16 multiplexer 96 formed by dual high/low word [31:16]/[15:0] isolation buffers. The VL bus interfaces to standard VL slots 97, and through a bidirectional isolation buffer 98 to the low double word [31:0] of the 64 bit processor data bus.

2. Generalized Pipeline Flow

Figure 3:
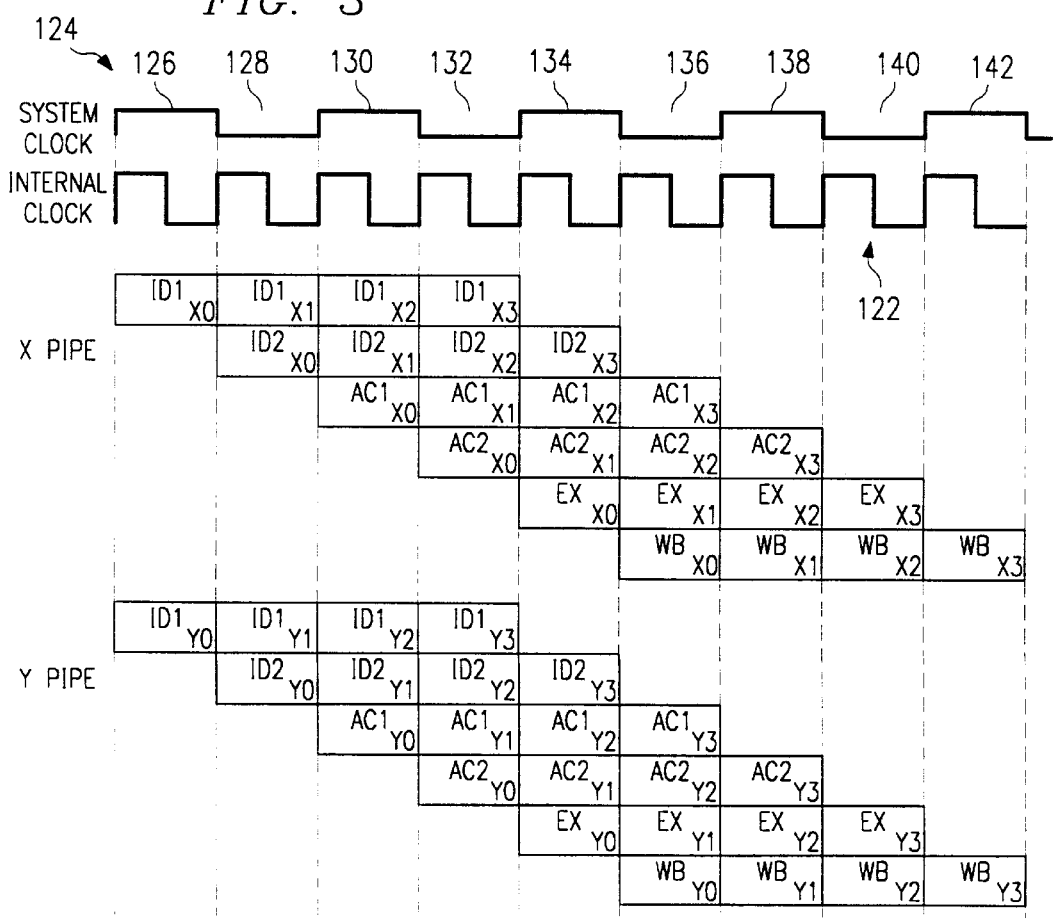
FIG. 3 illustrates a timing diagram showing the flow of instructions through the pipeline unit.

FIG. 3 illustrates the flow of eight instructions through the pipeline, showing the overlapping execution of the instructions, for a two pipeline architecture. Additional pipelines and additional stages for each pipeline could also be provided. In the preferred embodiment, the microprocessor 10 uses an internal clock 122 which is a multiple of the system clock 124. In FIG. 3, the internal clock is shown as operating at two times the frequency of the system clock. During the first internal clock cycle 126, the ID1 stage operates on respective instructions X0 and Y0. During internal clock cycle 128, instructions X0 and Y0 are in the ID2 stage (X0 being in ID2x and Y0 being in ID2y) and instructions X1 and Y1 are in the ID1 stage. During internal clock cycle 130, instructions X2 and Y2 are in the ID1 stage, instructions X1 and Y1 are in the ID2 stage (X1 being in ID2x and Y1 being in ID2y) and instructions X0 and Y0 are in the AC1 stage (X0 being in AC1x and Y0 being in AC1y). During internal clock cycle 132, instructions X3 and Y3 are in the ID1 stage, instructions X2 and Y2 are in the ID2 stage, instructions X1 and Y1 are in the AC1 stage and instructions X0 and Y0 are in the AC2 stage. The instructions continue to flow sequentially through the stages of the X and Y pipelines. As shown in clocks 134–140, the execution portion of each instruction is performed on sequential clock cycles. This is a major advantage of a pipelined architecture—the number of instructions completed per clock is increased, without reducing the execution time of an individual instruction. Consequently a greater instruction throughput is achieved without requiring greater demands on the speed of the hardware.

The instruction flow shown in FIG. 3 is the optimum case. As shown, no stage requires more than one clock cycle. In an actual machine, however, one or more stages may require additional clock cycles to complete thereby changing the flow of instructions through the other pipe stages. Furthermore, the flow of instructions through one pipeline may be dependent upon the flow of instructions through the other pipeline.

A number of factors may cause delays in various stages of one or all of the pipelines. For example, an access to memory may miss in the memory cache, thereby preventing access of the data in the time required to process the instruction in one clock. This would require that either, or both, sides of the EX stage to delay until the data was retrieved from main memory. For a particular stage, other stages of the pipeline may be using a needed resource, such as a multiplier, which is only in one of the execution stages in the illustrated embodiment. In this case, the stage must delay until the resource is available. Data dependencies can also cause delays. If an instruction needs the result from a previous instruction, such as an ADD, it must wait until that instruction is processed by the execution unit.

Other delays are caused by "multi-box" instructions; i.e., instructions which are implemented using multiple microinstructions, and therefore require more than one clock cycle in the EX pipe stage to complete. These instructions stop the flow of subsequent instructions through the pipeline at the output of the ID2 stage.

The flow of instructions through the pipeline is controlled by the pipe control unit (or pipe controller) 28. In the preferred embodiment, a single pipe control unit 28 is used to control the flow of instructions through both (or all) of the pipes. To control the flow of instructions through the pipes, the pipe control unit 28 receives "delay" signals from the various units comprising the pipelines 102 and 104, and issues "stall" signals to the various units.

Although a single pipe control unit 28 is used for both X and Y pipelines, the pipelines themselves are controlled independent of one another. In other words, a stall in the X pipeline does not necessarily cause a stall in the Y pipeline.

3. Pipeline Control

FIG. 4 illustrates the inter-stage communication between pipeline stages. The stages are arbitrarily designated as stage N−1, stage N, and stage N+1. Each stage has a unique input STALL from the pipe control unit 28 and an output DELAY. The DELAY output is enabled if the stage needs at least one more clock to complete the instruction it contains. For each pipeline, the pipe control unit 28 determines whether a stage of a pipe is "done" based on the DELAY signal. A stage is "done" if it is ready to pass its instruction to a succeeding stage. The STALL input to a stage is enabled by the pipe control unit 28 if the stage cannot transfer an instruction to the succeeding pipe stage, because that succeeding stage is delayed or stalled. In the preferred embodiment, a pipeline stage is stalled only if it is not delayed (i.e., the DELAY signal is false).

A "valid" pipe stage is one containing an instruction, either in progress or complete. An invalid pipe stage does not contain an instruction. An invalid pipe stage is said to contain a "bubble". "Bubbles" are created at the front end of the pipeline 100 when the ID1 and ID2 stages cannot decode enough instructions to fill empty AC1 and AC2 stages 112 and 114. Bubbles can also be created when a pipe stage transfers its instruction to the succeeding stage, and the prior stage is delayed. While the pipe stages do not input or output bits indicating the validity of the stages, bubbles in the stages are tracked by the pipeline control unit 28.

In some cases, a bubble in a pipe stage may be overwritten by an instruction from the preceding stage, referred to as a "slip." Pipe stages may also be "flushed", if they contain an instruction which should not complete due to an exception condition in a succeeding pipe stage. The signal FLUSH is an input to each pipe stage. A pipe stage generates an "exception" if its instruction cannot complete due to an error condition and should not transfer beyond the current stage. Exceptions can occur in the IF stage 106, the ID1 and ID2 stages, and the AC1 and AC2 stages for all instructions.

Certain instructions, designated as "exclusive" instructions may have exceptions occur in the execution stage 116. Furthermore, exceptions can occur for floating point instructions.

3.1. Generalized Stall Control

In the general case, the pipe controller will stall a stage of a pipeline if the stage is valid and it is not delayed and the next stage is either delayed or stalled. This may be described logically for a stage N as:

$$STALL_N = v_N \cdot !d_N \cdot (d_{N+1} + STALL_{N+1})$$

where: $v_N$ is true if stage N is valid,
$d_N$ is true if DELAY for stage N is true and
! denotes that the succeeding term is negated.

For a six stage pipeline, the description can be expanded as:

$STALL_6 = false$ $STALL_5 = v_5 \cdot !d_5 \cdot d_6$ $STALL_4 = v_4 \cdot !d_4 \cdot (d_5 + v_5 \cdot !d_5 \cdot d_6)$ $STALL_3 = v_3 \cdot !d_3 \cdot (d_4 + v_4 \cdot !d_4 \cdot (d_5 + v_5 \cdot !d_5 \cdot d_6))$ $STALL_2 = v_2 \cdot !d_2 \cdot (d_3 + v_3 \cdot !d_3 \cdot (d_4 + v_4 \cdot !d_4 \cdot (d_5 + v_5 \cdot !d_5 \cdot d_6)))$ $STALL_1 = v_1 \cdot !d_1 \cdot (d_2 + v_2 \cdot !d_2 \cdot (d_3 + v_3 \cdot !d_3 \cdot (d_4 + v_4 \cdot !d_4 \cdot (d_5 + v_5 \cdot !d_5 \cdot d_6))))$ When the pipe control unit 28 stalls a stage of a pipeline, it does not necessarily stall the corresponding stage of the other pipeline. Whether the other stage is stalled depends upon the sequence of instructions and other factors, as described below.

3.2. Pipe Switching

While the general model above works for an architecture where instructions flow through the pipe they enter, a more complex control structure is necessary when instructions are allowed to switch between pipes as shown in FIG. 2. The mechanism for determining whether a switch will occur is described in greater detail hereinbelow.

In the preferred embodiment, the pipe control unit 28 keeps the instructions "in program order" (or "in order") until they are passed from their AC2 stage to the EX stage. "In order" means that a "junior" instruction cannot be at a pipeline stage beyond a "senior" instruction (a junior instruction's position in the sequence of instructions received by the microprocessor is after that of a senior instruction), although a junior instruction may be at the same stage as a senior instruction. Thus, instruction $I_{T+1}$ (the junior instruction) can be in AC1x while instruction $I_T$ (the senior instruction) is in AC1y, but $I_{T+1}$ cannot advance to AC2x until $I_T$ advances to AC2y, although $I_T$ can advance without waiting for $I_{T+1}$ to advance.

Due to the sequential nature of the IF stage and the ID1 stage, instructions will not get out of order within these two stages. The flow of instructions through the ID2, AC1 and AC2 stages, however, necessitates modifications to the general stall mechanism. To aid in controlling instruction flow in this situation, the pipe control unit 28 maintains a control signal XFIRST for each pipe stage. If XFIRST is true for a particular stage, then the instruction in this stage of the X pipeline is senior to the instruction in the corresponding stage of the Y pipeline. In the illustrated embodiment, with two pipelines, XFIRST indicates which pipeline has the senior of the two instructions for a particular stage; for implementations with more than two pipes XFIRST would indicate the relative seniority of each instruction at each stage.

At the output of the ID2 units, the pipe control unit must determine whether an instruction can proceed to either the AC1x or AC1y. A senior instruction can proceed (assuming it is valid and not delayed) if the succeeding stage of either pipeline is not delayed or stalled. A junior instruction can proceed (assuming it is valid and not delayed) only if the senior instruction in the corresponding stage of the other pipeline will not delay or stall. This can be described logically as:

$$st_{3X} = v_{3X} \cdot (d_{3X} + d_{4X} + STALL_{4X})$$

$$st_{3Y} = v_{3Y} \cdot (d_{3Y} + d_{4Y} + STALL_{4Y})$$

where $st_3$ specifies whether the corresponding pipeline will stall or delay at or below the ID2 unit of that stage.

$$STALL_{3X} = v_{3X} \cdot !d_{3X} \cdot (d_{4X} + STALL_{4X}) + !XFIRST_3 \cdot st_{3Y}$$

$$STALL_{3Y} = v_{3Y} \cdot !d_{3Y} \cdot (d_{4Y} + STALL_{4Y}) + XFIRST_3 \cdot st_{3X}$$

3.3. Multi-box Instructions

The EX stage of each pipeline is controlled independently of the other EX stage by microinstructions from the microROM. While many instructions are implemented by a single microinstruction, and hence pass through the EX stage in a single clock cycle, some instructions require multiple microinstructions for their execution and hence require more than one clock cycle to complete. These instructions are referred to as "multi-box" instructions.

Because the microROM cannot be accessed by another instruction in the same pipeline during execution of a multi-box instruction, a new instruction cannot be passed from the ID2 stage of a pipe to an AC1 stage of a pipe until after the last microROM access for the multi-box instruction. This is due to the microROM being accessed during AC1. As the multi-box instruction reads its last microinstruction, the following instruction is allowed to access the microROM and enter AC1, so that no bubbles are produced.

When the ID2 stage of a pipeline receives an instruction from the ID1 stage, it decodes whether an instruction is multi-box. The pipe control unit 28 will stall the ID2 unit until the multi-box instruction is finished with the microROM. The EX unit will signal the end of a multi-box instruction via a UDONE signal. The control necessary to support multi-box instructions may be described as:

$$st_{3X} = !d_{3X} \cdot v_{3X} \cdot (d_{4X} + STALL_{4X} + MULTIBOX_{4X} \cdot !UDONE_{4X})$$

$$st_{3Y} = !d_{3Y} \cdot v_{3Y} \cdot (d_{4Y} + STALL_{4Y} + MULTIBOX_{4Y} \cdot !UDONE_{4Y})$$

$$STALL_{3X} = st_{3X} + !XFIRST_{3X} \cdot st_{3Y}$$

$$STALL_{3Y} = st_{3Y} + !XFIRST_{3Y} \cdot st_{3X}$$

Figure 19A:
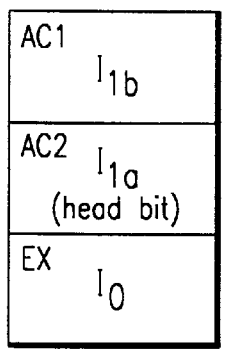
FIGS. 19*a* and 19*b* illustrate pipe control for multi-box instructions.

A multi-box instruction can use the resources of AC1, AC2, and EX. Additional pipe control relating to multi-box instructions is discussed in connection with FIGS. 19a–b In FIG. 19a, $I_0$ is in the EX stage of the X pipeline and $I_1$ a multi-box instruction, is in the AC2 ($I_{1a}$) and AC1 ($I_{1b}$) stages. From the viewpoint of the pipe control unit, the multi-box instruction $I_1$ is treated as a single instruction, and a delay in any stage occupied by the multi-box instruction will cause all stages associated with the multi-box instruction to stall. Thus, a delay in $I_{1b}$ will cause $I_{1a}$ to stall, even though $I_{1a}$ is in front of $I_{1b}$ in the pipeline. This is the only situation in which a delay in one stage will result in a stall in a succeeding stage.

The pipe control unit 28 keeps track of the boundaries between instructions through the use of a head bit associated with each microinstruction. The head bit indicates whether the microinstruction is the first microinstruction of an instruction, even if the instruction is a one-box instruction. If the head bit is not true for a given microinstruction, then it is not the first microinstruction. By checking the head bit for each microinstruction in a pipeline, the pipe control unit can determine boundaries between instructions and stall the stages accordingly.

3.4. Exclusive Instructions

Another type of instruction used in the preferred embodiment is an "exclusive" instruction. Any instruction which has the possibility of causing an exception while executing in the EX stage is labeled as exclusive. Exceptions are discussed in greater detail below. An instruction requiring multiple memory accesses is labeled exclusive because it may cause an exception during such an access. Other instructions are labeled as exclusive because they modify control registers, memory management registers or use a limited resource such as a multiply. Exclusive instruction may be either single-box or multi-box. Exclusive instructions must be executed alone (i.e., no other instruction is used in the corresponding stage of the other pipe), due to the exclusive instruction's effect on the state of the machine or because the instruction can benefit from the use of both EX units. Examples of exclusive instructions from the 486 instruction set are: ARPL, BOUND, CALL, CLC, CLD, CLI CLTS, CMC, CMPS, DIV, ENTER, HLT, IDIV, IMUL, IN, INS, INT, INTO, INVD, INVLPG, IRET, LAHF, LAR, LEAVE, LGDT, LIDT, LGS (PM), LSS (PM), LDS (PM), LES (PM), LFS(PM), LLDT, LMSW, LODS, LSL, LTR, MOV (SR), MOVS, MUL, OUT, OUTS, POPA, POPF, POP MEM, PUSHA, PUSHF, PUSH MEM, RET, SAHF, SCAS, SGDT, SIDT, SLDT, SMSW, STC, STD, STI, STOS, STR, VERR, VERW, WAIT, and WBINVD, where "PM" denotes a protected mode instruction and "SR" denotes an instruction using special or control registers.

The ID1 stage decodes which instructions are exclusive. The pipe control unit 28 stalls exclusive instructions at the ID2 stage until both AC1x and AC1y stages are available.

Figure 19B:
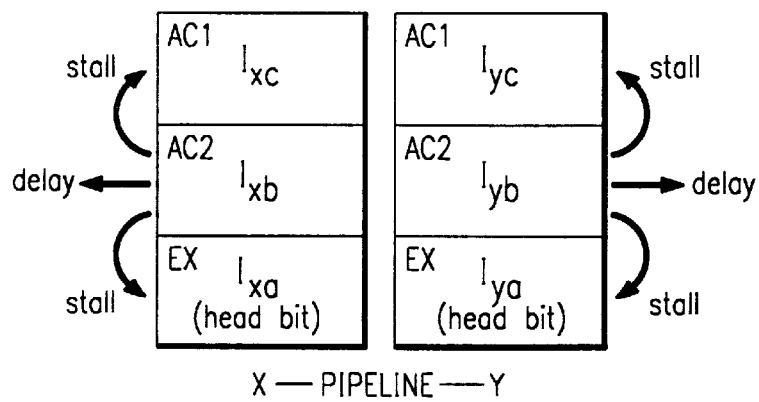

FIG. 19*b* illustrates the effect of a delay of an exclusive multi-box instruction. In FIG. 1*a*, an exclusive multi-box instruction occupies the EX AC2 and AC1 stages for both the X and Y pipelines. If any of the stages occupied by the exclusive multi-box instruction delays, the corresponding stage of the opposite pipeline will also delay, and the other stages associated with the multi-box instruction will be stalled by the pipe control unit in order to keep the multi-box instruction together. Hence, if instruction $I_{xb}$ delays, then $I_{yb}$ delays and $I_{xa}$, $I_{ya}$, $I_{xc}$ and $I_{yc}$ are stalled. With an exclusive multi-box instruction, two head bits, one for each pipeline, are used to denote the beginning of the instruction.

4. In order Passing/Out-of-Order Completion of Instructions

As described above, instructions are maintained in order by the pipe control unit 28, until they pass from the AC2 stage to the EX stage. An instruction is considered "passed" to the EX stage once execution begins on the instruction, since some preliminary procedures relating to advancement to the next stage, such as changing pointers to the instruction, may be done before all exceptions are reported. Once an instruction passes from an AC2 stage to an EX stage, it can complete its execution out-of-order (i.e., the junior instruction can continue on to the write back stage before the senior instruction), unless there is a resource or a data dependency which prevents the instruction from executing out-of-order. For example, a read-after-write (RAW) dependency would prevent an instruction from completing its EX stage until the dependency is cleared. Thus, an instruction such as ADD AX,BX cannot complete its EX stage until execution of a previous ADD BX,CX is completed, since the value of operand BX is dependent upon the previous instruction. However, junior instructions which pass to the EX stage without dependencies on a senior instruction may complete, and it is therefore possible for many instructions to pass a senior instruction which requires multiple clock periods in the opposite EX stage. This aspect of the preferred embodiment greatly increases instruction throughput.

In the preferred embodiment, instructions are maintained in order until they cannot cause an exception. An exception is caused by a program error and is reported prior to completion of the instruction that generated the exception. By reporting the exception prior to instruction completion, the processor is left in a state which allows the instruction to be restarted and the effects of the faulting instruction to be nullified. Exceptions include, for example, divide-by-zero errors, invalid opcodes and page faults. Debug exceptions are also handled as exceptions, except for data breakpoints and single-step operations. After execution of the exception service routine, the instruction pointer points to the instruction that caused the exception and typically the instruction is restarted.

Any instruction which is capable of causing an exception must be restartable. Accordingly, if an exception occurs, the state of the machine must be restored to the state prior to starting the instruction. Thus, changes to the state of the machine by the instruction causing the exception and subsequent instructions must be undone. Typically, restarting the instruction involves resetting the state of the register file and restoring the stack pointer, the instruction pointer and the flags. Because most exceptions occur at the AC2 stage, the exception is asserted at the output of the AC2, except for exceptions in the EX stage for exclusive instructions. The instructions are restarted at the ID1 stage.

If the instruction causing the exception is junior to the instruction in the corresponding AC2 stage (the neighboring instruction), then the neighboring instruction may continue to the EX stage. However, if the instruction causing the exception is the senior instruction, both instructions must be restarted. In other words, the state of the machine must be restored to the state which existed prior to any changes caused by the instruction causing the exception and will allow instructions earlier in the program sequence to continue through the pipelines.

In order to allow the state changes to be undone, the instructions are maintained in program order through the AC2 stage and instructions which can cause an exception in the EX stage are designated as exclusive instructions. Examples of exclusive instructions that may cause an exception in the EX stage are DIV (divide), which may cause a divide by zero error, and instructions which must perform memory access during the EX stage like PUSHA.

In the preferred embodiment, if a non-exclusive multi-box instruction is executing in one pipeline, multiple instructions may flow through the other pipeline during execution of the multi-box instruction. Because a multi-box instruction may use the AC1, AC2 and EX stages, only the stage processing the microinstruction with the head bit for the multi-box instructions is kept in order. Hence, the AC1 and AC2 stages will not prevent junior instructions from advancing if the stages do not contain the microinstruction with the head bit. Two factors will control whether instructions can continue to flow: (1) whether the multi-box instruction creates a data dependency with a junior instruction or (2) whether the multi-box instruction causes a resource dependency with a junior instruction.

Resource dependencies are created when the junior instruction needs a resource being used by the senior instruction. For example, in the preferred embodiment, only the X-side EX unit has a multiplier, in order to reduce the area for the EX units 116. If a multi-box instruction is operating in the X-side EX unit a subsequent instruction needing the multiplier cannot be executed until after completion of the senior instruction.

FIG. 5 illustrates a flow chart illustrating the general operation of the pipe control unit 28 with regard to the passing of instruction from the AC2 stage to the EX stage and the completion of the EX stage.

In block 200, the pipe control determines whether an instruction can cause an exception at its present stage (or beyond). If not, in block 202, the instruction is allowed to complete ahead of senior instructions (so long as those senior instruction can no longer cause an exception). If the instruction may still cause an exception, then the pipe control will not allow the instruction to change the state of the microprocessor before all senior instructions have made their changes to the state of the microprocessor at that state (block 204). In other words, all state changes are made in program order until the instruction can no longer cause an exception.

In the more specific case, discussed above, block 204 of the flow diagram is implemented by maintaining the program order of instructions through the AC2 stage. For the majority of instructions in the X86 instruction set, it can be determined whether an instruction will cause an exception by the AC2 stage. Exclusive instructions, which are allowed to cause an exception in the EX stage, are executed alone in the EX stage so that the state of the machine may be restored if an exception occurs.

While the above description provides that the instructions are kept in order through the point where they can no longer cause an exception, an alternative, more general, method of pipe control would be to allow instructions to proceed out of order, so long as the instruction did not alder the state of the processor.

5. Pipe Switching

The pipe control unit 28 controls whether an instruction switches between pipelines after the ID2 stage. Hence an instruction may progress through the pipelines from ID2x to either AC1x or AC1y and from ID2y to either AC1x or AC1y under the control of the pipe control unit 28.

In the preferred embodiment, the pipe control unit 28 will decide which pipe, X or Y, to place an instruction based on certain criteria. The first criteria is whether one pipeline has a bubble which could be removed. If so, the pipeline will try to move the most senior of the instructions in the ID2 stage into that pipeline. Thus if AC1x is valid and AC1y is invalid, and the instruction in ID2x is the senior of the two instructions in the ID2 stage, then the pipe control unit 28 will transfer the instruction from ID1x to AC1y.

The second criteria is to prevent new bubbles in the pipeline from occurring. To prevent bubbles from occurring, the pipe control unit 28 will attempt to keep dependent pairs of instruction, where the dependent instruction may be delayed, from affecting other instructions. To accomplish this, in the preferred embodiment, the pipe control unit 28 will keep adjacent instructions in program order from being on top of one another in a pipeline.

FIG. 6*a* illustrates this problem. At time T1, instruction I1 is in EXx, instruction I2 is in EXy, instruction I3 is in AC2y and instruction I4 is in AC2x. I2 has a read-after-write dependency on I1; in other words, for instruction I2 to be properly processed in the EXy stage, it must wait for the outcome of instruction I1 in the EXx stage. For example, I1 could be an ADD AX,BX instruction and I2 could be an ADD AX,CX instruction. I2 cannot complete because one of its operands will not be ready until after I1 completes. At time T2, I1 completes, leaving a bubble in EXx. I2 is executing in EXy. I3 cannot proceed to the EX stage until I2 completes. I4 cannot proceed to the EX stage because it is junior to I3 and, as stated above, instructions cannot proceed past a senior instruction until entering the EX stage.

The consequence of maintaining adjacent instructions in program order from being on top of one another in a pipeline is shown in FIG. 6*b*. In this example, the pipe control unit 28 has ordered the pairs in AC2 at time T1 such that I3 is in AC2x and I4 is in AC2y. The reason for ordering the instructions in this manner is to prevent I3 from being above I2 in the Y pipeline. Thus, at time T2, I1 has completed the EX stage and moves to the writeback stage. I3 can now move into EXx, thus preventing the occurrence of a bubble in EXx. Similarly, I5 can move into AC2x.

In some instances, the pipe control unit 28 must place adjacent instruction above one another in a pipeline. Typically, this situation is caused by an X-only instruction, which must be placed in the X pipeline, or because the pipe control unit 28 needed to remove a bubble, which necessitated a perturbation in the desired order. FIG. 7 illustrates such a situation. At time T1, I1 and I2 are in EXx and EXy, respectively, I3 and I4 are in AC2x and AC2y respectively, I5 and I6 are in AC1y and AC1x, respectively, because I6 is an X-only instruction and therefore the pipe control unit 28 was forced to put I6 into AC1x, even though doing so forced I5 to be on top of I4 in the Y pipeline. I7 and I8 are in ID2x and ID2y, respectively. I4 has a read-after-write dependency on I3 and I6 has a read-after-write dependency on I5. At T2, I1 and I2 have moved to the WB stage and I3 and I4 have moved into the EX stage. I6 has moved to AC2x and I5 has moved to AC2y; therefore the pipe control unit 28 has allowed I7 and I8 to switch pipelines in order to prevent I7 from being on top of I6 in the X pipeline. I9 and I10 have moved into ID2.

At T3, I3 has completed in EXx and moved to EXy and I4 remains in EXy to complete its operation. As described in connection with FIG. 6*a*, neither I5 or I6 can proceed down either pipeline, and thus instructions I5 and above remain in their respective stages. At T4, I4 completes and I5 and I6 move into EXy and EXx, respectively. I7 and I8 move to AC2y and AC2x, respectively, I9 and I10 move to AC1y and AC1x, respectively, to prevent adjacent instructions I9 and I8 from both being in the X pipeline. I11 and I12 move into the ID2 stage.

At T5, I5 completes and I7 moves into EXy. I6 stays in EXx because of the read-after-write dependency. I9 moves to AC2y, I11 moves to AC1y and I3 moves to ID2x. As can be seen, the potential bubble created by I6 remaining in EXx has been avoided due to proper sequencing of the instructions by the pipe control unit 28.

Although a specific ordering of instructions has been described in connection with FIGS. 6–7, other methods of sequencing instructions may be used to promote the efficient flow of instructions through the pipeline. Also, the point of switching need not be at the ID2 stage. As shown above, the pipe control unit 28 uses the switching point to provide a sequence of instructions which reduces dependencies between instructions which could cause bubbles to be created.

A flow chart illustrating the general operation of the pipe control unit with regard to pipe switching is shown in FIG. 8. In block 210, the pipe controller determines whether the instruction must be placed down a certain pipeline, such as an X-only instruction. If so, the pipe control unit 28 will place the instruction in that pipeline as available in block 212. If the instruction can be placed in any pipe, the pipe control unit 28 will determine, in decision block 214, whether there is a bubble in either of the pipelines which could be filled. If so, the pipe control unit 28 will move the instruction into the stage with the bubble in block 216. If there are no bubbles (or if both pipelines are available), the pipe control unit 28 will place instructions in the X or Y pipelines based on an evaluation of the best sequence for avoiding dependencies (blocks 218 and 220). As described above, in one embodiment, the pipe controller avoids dependencies by avoiding the placement of adjacent instructions above one another in the same pipeline.

6. Issuing Instructions Without Regard to Dependencies

The issuance of instructions from ID1 to ID2 is done without regard to dependencies which may exist between the two instructions. Other microprocessors determine whether a pair (or more) of instructions have a dependency, and if so, the instructions will not issue simultaneously. In such a case, the first instruction will be issued with a bubble in the corresponding stage in the other pipe, and the bubble will remain in the other stage throughout the flow of instructions through the pipeline. Consequently, the number of instructions that are processed over a given time period will be reduced.

The microprocessor disclosed herein is designed such that instructions are issued simultaneously into the pipelines even though there may be a dependency between the instructions. The dependency is checked at the point where the instruction needs to use the data for which it is dependent.

The point at which the dependency will cause a stall in the pipeline depends upon the nature of the dependency; if the dependent data is needed for an address calculation, the stall will occur in AC1, if the data is needed for execution, the stall will occur in EX. Until the time of the stall, movement of the instructions in the pipe or other mechanisms may resolve the dependency, and thus provide for a more efficient flow of instructions.

7. Multi-threaded EX Operation

The microsequencer circuitry 23 provides independent flows of microinstructions to the EX stages. Hence, control of the EXx stage is independent of control of the EXy stage. However, some exclusive instructions can benefit from the use of both the EXx and EXy stage. For these instructions, the EX stages of both pipelines are used to complete the instruction.

For some multi-box exclusive instructions, in addition to using both EX stages, the instruction has access to both AC stages for address calculations. When an instruction uses the AC resources while it is in an EX stage, the AC is also microinstruction controlled.

While both EX (and AC) stages are being used to execute a single instruction, the respective EX stages continue to receive two independent flows of microinstructions from the microsequencer. The operation of the two EX units is maintained by proper coding of the microinstructions.

By controlling the execution of both EX stages by two independent microinstruction flows, rather than using a single microinstruction word to control both EX stages, greater flexibility in performing the instruction is provided, thereby increasing performance. Further, the additional hardware which would be necessary for single microinstruction control of the two EX stages is avoided.

8. Register Translation Unit

8.1. Register Translation Overview

The register translation (25a in FIG. 1a) unit is used for instruction level data hazard detection and resolution. Before executing the EX pipe stage, each instruction must have its source operands valid. The register translation unit is used to track each of the registers to determine if an active instruction has an outstanding write (a "write pending"). If an instruction has a source register with a write pending, the residual control word (shown in FIGS. 15a–b and 16a–b) associated with the instruction is marked at the AC1 stage to indicate that the source register has a write pending. As the instruction progress through the pipeline, each stage "snoops" the writeback bus to detect a write to the dependent register. If a write to the dependent register is detected, the write pending field associated with the source register is cleared.

FIG. 9 illustrates a general block diagram of the register translation unit 25a. Physical Register circuitry 24 (see FIG. 1a) includes thirty two physical registers for storing information directed to the eight logical registers of the X86 architecture. Access to the physical registers is controlled by the register translation unit 25a. State information relating to the physical and logical registers is stored in translation control registers 236. Translation control circuitry 238 manages access to the physical registers based on the state information.

A true data dependency arises from a RAW hazard which prevents the instruction from completing. There are also dependencies corresponding to a WAR (write-after-read) hazard, called an antidependency, and a WAW (write-after-write) hazard, called an output dependence. Antidependencies and output dependencies, which are not true data dependencies, can be removed through the use of register renaming, which is controlled by the register translation unit 25a. In register renaming, more physical registers are provided than the architecture defines (logically or architecturally). By assigning a new physical register each time a logical register is to be written (destination of result), the register is renamed and eliminates both WAR and WAW hazards.

The X86 architecture defines 8 general purpose programmer visible registers (EX, EBX, ECX, EDX, EDI, ESI, EBP, ESP). In the illustrated embodiment, there are 32 physical registers which will be used to map the eight general purpose registers (logical registers). Since the microprocessor will predict and execute instructions before a conditional branch has completed execution, the register translation unit must be able to handle the consequences of a mispredicted branch. If the prediction is incorrect, the microprocessor must restore the state back to the point of the conditional branch. As described below, checkpointing is used to save state information before the speculative path is taken. Recovery from a incorrectly predicted conditional branch involves reverting to the checkpointed physical registers.

For each AC1 pipe stage, the following operations are completed by the register translating and renaming hardware.

1. Allocate (rename) up to two new registers which are destinations of the current instructions in the AC pipe stage. The allocation will proceed in program order due to dependencies created if both instructions specify the same register as destinations.

2. Check for RAW dependencies for instructions in AC pipe stage.

3. Check physical register ID's on the write back bus for registers used during AC for address calculations to enable bypassing and clearing of the write pending bit in the register translation unit.

4. Logical to physical translations for up to four registers.

8.2. Translation Control Registers

FIG. 10 illustrates the translation control registers 236. A Logical ID register 240 maps logical registers to physical registers. The Size register 242 stores a code corresponding to the size of the logical register to which the physical register is assigned. This aspect is discussed in greater detail below. The Current register 244 indicates the registers which are the most recently assigned for a given logical register. Thus, every time a new physical register is allocated, the current bit for the physical register which previously was the current register for the corresponding logical register is turned off and the current bit for the newly allocated register is turned on. Consequently, at any time, the Current register 244 has eight bits on and twenty-four bits off For each physical register, the Pending 246 register has a bit which indicates whether a write to that physical register is pending.

Four checkpoint registers 248, Chkpnt0—Chkpnt3, are used to store a copy of the Current register 244, each time a checkpoint occurs. In the preferred embodiment, checkpoints occur whenever a conditional branch or a floating point operation passes through AC1. The checkpoint registers 248 are written to in a rotating basis. Exception Restore registers 250 store the current bits for each instruction in AC1, AC2 and EX, as they existed before the allocation for the instruction was made in the AC1 stage. The contents of the Exception Restore registers follow the instructions as they move from stage to stage.

8.3. Register Allocation

For each instruction which writes results to a logical register, a new physical register is allocated by the register translation unit 25a. The register allocation process first identifies a "free" physical register, i.e. a register which is not in use. Detection of free registers is discussed in connection with FIG. 11. Once a free register is located, the logical register number is placed in the physical register data structure and is marked current. The previous physical register which represented the logical register has its current bit cleared.

Figure 11:
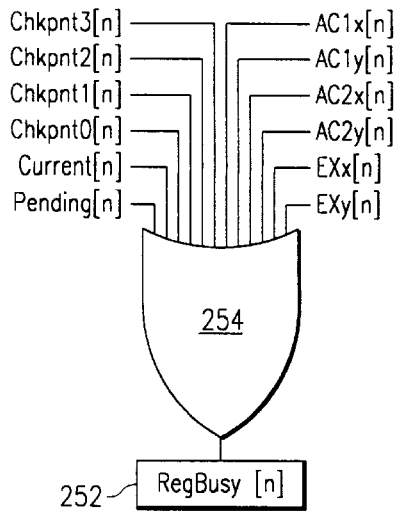
FIG. 11 illustrates circuitry for generating bits for the Register Busy register.

Circuitry for identifying a free register is shown in FIG. 10–11. A Register Busy register has one bit location for each physical register. Each bit of the Register Busy register 250 is set responsive to corresponding locations in the Pending, Current, Checkpoint and Exception Restore registers. As shown in FIG. 11, bit n of the Register Busy register 252 is the result of a logical OR operation on the nth bit of the Pending, Current, Checkpoint and Exception Restore registers. A register 252 is free if it corresponding bit in the Register Busy register is set to "0" and is in use if the corresponding bit is set to "1".

Upon allocation, the corresponding bit of the Current register is set to "1" to mark the physical register as the current register. A code is placed in the corresponding three bits of the Logical ID register 240 to indicate the logical register to which the physical register is assigned, and the corresponding bits of the size register are set to the size of the logical register being allocated (see Table 1 below). The pending bit corresponding to the physical register is also set. The instruction causing the allocation will write to the assigned physical register and any reads by subsequent instructions from the logical register will result in reads from this new physical register. This renaming will occur during the AC1 pipe stage and will be processed in program order. Processing the instructions in program order is required for the case where both instructions in AC1x and AC1y specify the same logical register as a source and destination. As an example, this can occur if both instructions are an ADD and the AX register is defined as both a source and destination. Through register renaming two new physical registers will be allocated for the logical AX register, with the last one being marked as the current one. The example below shows how each instruction is renamed.

First instruction: (ADD AX, BX). Assume the physical register IDs for the AX and BX registers are currently "1" and "2", respectively, when the ADD instruction is received in AC1. Since the AX register is also the destination, a new physical register will be allocated for AX. This physical register will have an ID of "3" (assuming that physical register "3" is free). The add instruction would then add physical registers "1" and "2" and write the results into register "3".

AX (physical register 1)+BX (physical register 2)→AX (physical register 3)

Second instruction: (ADD AX,BX). Since the AX register is a destination, a new physical register will be allocated for AX. This will have the ID of "4". Since the previous instruction renamed the AX register to the physical "3", it will be used as the AX source for the ADD, since it is marked as current as of the time of the allocation. Therefore, the second ADD instruction would add physical registers "3" and "2" and write the results into register "4."

AX (physical register 3)+BX (physical register 2)→AX (physical register 4)

Since the X86 architecture allows certain registers to be addressed as words (e.g. "AX"), low bytes (e.g. "AL"), high bytes (e.g. "AH") or double words (e.g. "EAX"), a size is specified for each allocation, based on how the register was specified by the instruction. The possible allocatable portions of a register are shown in FIG. 12a for the EAX register. Each physical register has a corresponding two bit field in the Size register which stores the code. Exemplary codes are shown in Table 1.

TABLE 1

| Codes for Size Register | | |
|---|---|---|
| Code | Size | Example |
| 00 | word | AX |
| 01 | low byte | AL |
| 10 | high byte | AH |
| 11 | double word | EAX |

Figure 12B:
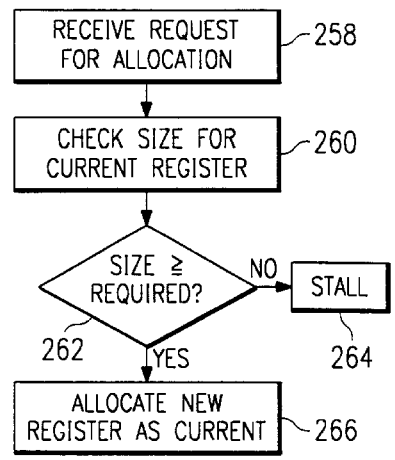
FIG. 12*b* illustrates a flow chart for allocating logical registers with variable sizes.
Figure 12A:
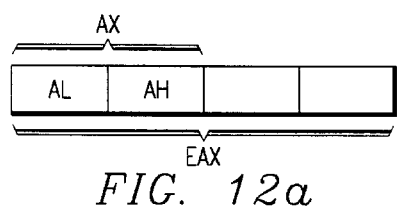
FIG. 12*a* illustrates a representation of a variable size extended register under the X86 architecture.

A method for register translation using variable size registers is shown in the FIG. 12b. A request for allocation is received in block 258. The size of the register to be allocated is compared with the size of the corresponding current register in blocks 260–262. If two instructions specify the same logical destination register but as different sizes (i.e., AH and AL), where the logical destination of the second instruction in program order does not fully include the portion of the logical register allocated to the first instruction, a RAW dependency based on size is created. Accordingly, a register cannot be allocated until this dependency has been resolved (block 264). If the size of the logical register with a pending write of an instruction encompasses the portion of the logical register specified by an earlier instruction (as defined in Table 2 below, using the EAX register as an example), the new register can be allocated (block 266). The translation control circuitry 238 compares the size of the logical register to be allocated with the size of the current register for that logical register and determines whether the register may be allocated or whether the instruction must be stalled.

TABLE 2

Register Sizes which Allow Allocation for Registers with Size Dependencies

| Size of Register with Pending Write | Allowable Sizes for Allocating New Registers |
| --- | --- |
| AL | AL, AX, EAX |
| AH | AH, AX, EAX |
| AX | AX, EAX |
| EAX | EAX |

8.4. Instructions With Two Destinations

The majority of X86 instructions specify only one register destination. There are a few which specify two register destinations (e.g., XCHG AX,BX). So as not to complicate the register translation unit hardware, only one destination for an instruction can be renamed each clock. Therefore, a special case for the instructions which specify two destinations is used. These instructions, while in the AC1 pipe stage, will stall any other instruction from using the register translation hardware for one clock, so the second destination can be renamed.

8.5. Checkpointing Registers for Speculative Branch Path Execution

The microprocessor will predict the outcome of a conditional branch, and begin executing instructions based on the predicted branch, before the branch has completed execution. If the prediction was incorrect, the microprocessor must restore the state back to the point of the conditional branch. The register translation unit 25a (FIG. 1a) allows the microprocessor to save the state at the boundary of a conditional branch by checkpointing the registers by copying the Current register 244 to one of the Checkpoint registers 248 before the speculative path is taken. In the preferred embodiment, the registers are also checkpointed for floating point operations. The Checkpoint registers 248 are written to in a rotating order.

Since checkpoint allows the microprocessor to return to the state of the checkpoint, it could be used for every instruction. However, resources must be provided for each checkpoint, and therefore, there is a trade-off between the functionality of checkpointing and the hardware resources to be allocated to checkpointing. In the illustrated embodiment, the checkpoint registers are four deep; therefore, up to four checkpoints may be used at any one time.

Recovery from an incorrectly predicted conditional branch (or a floating point error) involves reverting to the checkpointed physical registers. When a conditional branch enters the AC stage of the pipeline the Current register 244 is copied to one of the Checkpoint registers 248, on a rotating basis maintained by translation control circuitry 238. This checkpoints the Current registers at the point of the conditional branch. While executing instructions from the predicted path, new registers will be allocated. When a new register is allocated, the physical register that is marked current will clear its current bit, as it normally would. If the predicted path is incorrect, then the Checkpoint register 248 associated with the conditional branch is copied to the current register, which will restore the state of the physical registers to the state which existed immediately prior to the conditional branch. Hence, the microprocessor may recover from a mispredicted branch or a floating point error in a single clock cycle.

8.6. Recovery from Exceptions

Recovery from exceptions is similar to recovery from a mispredicted branch. If an exception occurs with a given stage (AC1x, AC1y, AC2x, AC2y, EXx, EXy), the Exception register 250 associated with that stage is copied into the current register. Since the Exception register for a given stage contains a copy of the Current register 244 as it existed prior to the allocation (which occurred in the AC1 stage) for the present instruction in the stage, copying the associated Exception register 250 to the Current register 244 will reset the association of the physical registers to the logical registers to that which existed before the exception causing instruction entered AC1. Thus, the present invention allows the state of the machine to be modified, even though the instruction modifying the state may later cause an exception.

To determine which Exception register should be used to restore the Current register 244, the register translation unit 25a (FIG. 1a) uses information from the pipe control unit 28. When an exception occurs, the pipe control unit will flush stages of the pipelines. Using signals from the pipe control unit which indicate which stages were flushed, and which stages were valid at the time of the flush, along with the XFIRST bit for each stage, the register translation unit will determine the most senior flushed stage. The exception register corresponding to this stage is copied into the Current register 244.

8.7. Microcontrol of the Register Translation Unit and Renaming

The register translation unit 25a is normally controlled via signals produced by the pipeline hardware. In certain instances, however, it is beneficial to control the register translation unit 25a through microcode signals generated by the microsequencer as part of an instruction. For example, exclusive instructions will require access to the register translation unit hardware to determine which physical register is mapped to a logical register. Instructions such as PUSHA (push all) require a logical to physical translation of all eight logical registers during their execution.

Figure 13:
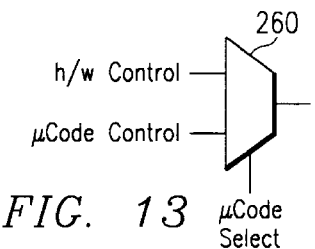
FIG. 13 illustrates circuitry for selectable control of the register translation unit.

To efficiently accommodate the need to access the register translation unit by exclusive instructions, control signals are multiplexed into the register translation unit 25a through multiplexers controlled by the microcode, as shown in FIG. 13. Control signals generated by the hardware and by the microcode (via the microsequencer) are input to a multiplexer 260. The multiplexer passes on of the control signals based on the value of a Microcode Select signal which controls the multiplexer 260. The Microcode Select signal is generated by the microcode. Hence, if the microcode associated with an instruction needs the register translation unit 25a, one of the microinstruction bits enables the multiplexers 260 to pass the microcode control signals rather than the signals from the pipeline hardware. Other bits of the microinstruction(s) act as the control signals to the register translation unit 25a to enable the desired function. Instructions which do not need the register translation unit for their execution will enable the multiplexers to pass only the control signals generated by the hardware.

8.8. Register ID Translation and Hazard Detection

Responsive to a request for a logical register, the register translation unit 25a will supply the identification of the current physical register mapped to the requested logical register. Also, the register translation unit will output eight bits, one for each logical register, indicating whether the current physical register for the associated logical register has a write pending. These bits are used to detect RAW hazards.

Figure 14A:
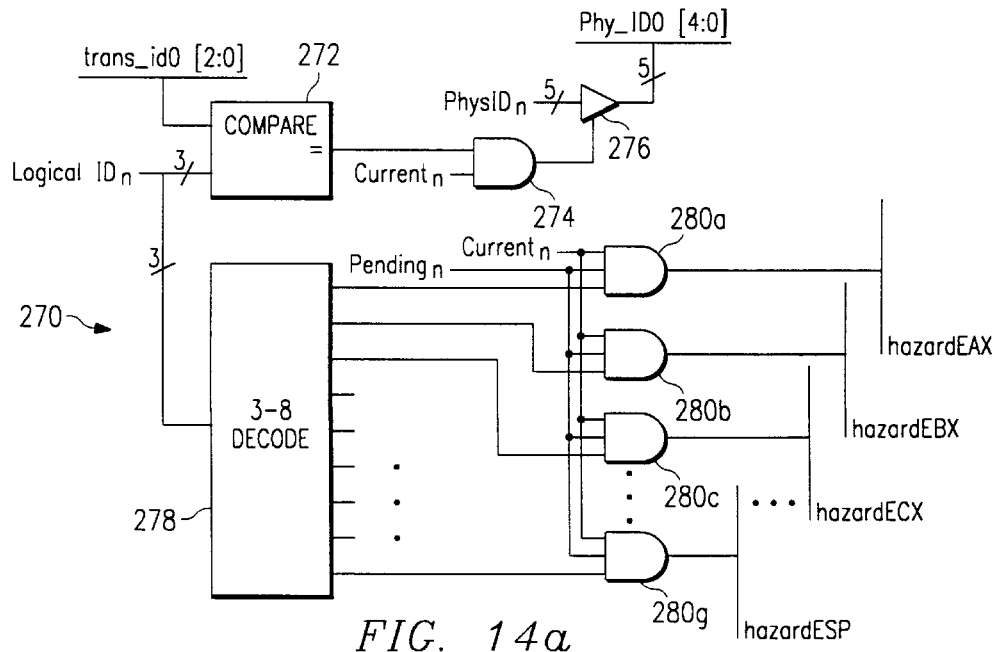
FIGS. 14*a* and 14*b* illustrate the portions of the register translation unit for performing translation and hazard detection.

In the preferred embodiment, the register translation unit is formed from a plurality of cells, each cell representing one physical register. FIG. 14a illustrates a schematic representation of one cell 270 as it relates to register ID translation and hazard detection. In response to a 3-bit code representing one of the eight logical registers placed on the trans_id bus, a 5-bit code representing the current physical register for the specified logical register will be place on the phy_id bus. Each cell 270 receives the code from the trans_ID bus. The 3-bit code on the trans_id bus is compared to the bits of the Logical ID register corresponding to that cell. In the preferred embodiment, the bits of the control registers 240–252 are divided between the cells such that each cell contains the bits of each register 240–252 corresponding to its associated physical register.

The Logical ID bits are compared to the 3-bit code by comparator 272. The match signal is enabled if the 3-bit code equals the Logical ID bits. The match signal and the Current bit for the cell are input to AND gate 274. Hence, if the physical register represented by the cell is associated with the specified logical register, and if the physical register is marked as the current register for the specified logical register, the output of the AND gate 274 will be a "1". The output of AND gate 274 enables a 5-bit tri-state buffer 276. If the output of the AND gate is a "1", the buffer passes the physical ID associated with the cell to the phyjd bus. For a given logical register ID, only one physical register will be current; therefore, only one cell will have its tri-state buffer enabled.

The Logical ID bits are also input to a 3-to-8 decoder 278. Thus, one of the eight outputs of the decoder 278 will be enabled responsive to the logical register mapped to that cell. Each output of the decoder 278 is coupled to the input of a respective AND gate 280 (individually denoted as AND gates 280a–280g). Each AND gate 280 also receives the Current and Pending bits for the physical register associated with the cell. The output of each AND gate 280 is coupled to a respective hazard bus associated with each logical register. For example, AND gate 280a is coupled to the hazardEAX bus which is associated with the EAX logical register. AND gate 280g is coupled to the hazardESP bus which is associated with the ESP logical register.

Figure 14B:
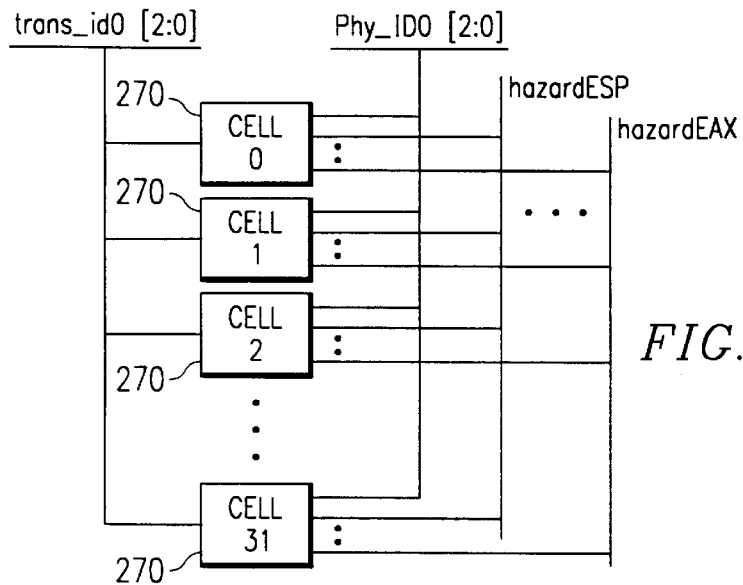

For a given cell, at most one AND gate 280 will be enabled, if that cell represents the logical register mapped to the physical register represented by that cell, and if the physical register is marked current with a write pending. As shown in FIG. 14b, the hazard buses perform a wired-OR on the outputs of each cell. For each hazard bus, only one of the associated AND gates 280 will be enabled, since only one Current bit associated with the logical register will be enabled. If the Pending bit associated with the current physical register is also enabled, the corresponding AND gate 280 will be enabled and the hazard bus will indicate that there is a write pending to that logical register. This information is used to detect RAW hazards.

9. Forwarding

As described above, a RAW dependency will cause the microprocessor to stall on the dependent instruction. In the preferred embodiment, a technique is used to eliminate RAW dependencies in certain situations in order to increase instruction throughput.

Thus, in the preferred embodiment, the processor of the present invention uses a technique referred to herein as "forwarding." Forwarding modifies instruction data to eliminate RAW dependencies between two instructions which are both in the EX stage at the same time.

Two types of forwarding are used in the preferred embodiment. "Operand forwarding" substitutes, under certain conditions, the source data for a junior instruction with the source of a senior MOV (or similar) instruction. "Result forwarding" substitutes, under certain conditions, the destination of a MOV (or similar) instruction with the result of a senior instruction.

The following code illustrates operand forwarding:
1) MOV/AX,BX
2) ADD AX,CX

Using operand forwarding, the junior ADD instruction will be effectively modified to BX+CX→AX. The manner in which forwarding is implemented is shown in FIGS. 15a–b. As shown in FIG. 15a, each instruction is associated with a residual control information which includes the sources (along with fields indicating whether there is a write pending to each source) and destinations for the operation, among other control information (not shown). Thus, assuming that physical register "0" is allocated to logical register BX and physical register "1" is allocated to logical destination register AX, a "0" is stored in the SRC0 field and a "1" is stored in the DES0 field of the residual control word associated with the MOV instruction. Similarly, assuming that physical register "2" is allocated to logical register CX, a "1" is stored in the SRC0 field of the residual control word associated with the ADD instruction (since the destination register of the MOV instruction is one of the sources for the ADD instruction), a "2" is stored in the SRC2 field and a "3" is stored in the DES0 field, since register renaming will find a free register for the logical destination AX register.

As can be seen, a RAW dependency exists between the MOV and the ADD instruction, since the MOV instruction must write to physical register "1" prior to execution of the ADD instruction. However, using operand forwarding, this dependency can be eliminated. As shown in FIG. 15b, operand forwarding does not affect the MOV command. However, the residual control word of the ADD instruction is modified such that the SRC0 field points to the physical register associated with logical source register BX.

Similarly, result forwarding modifies the residual control word of a junior MOV instruction with the result of a senior instruction. To describe result forwarding, the following sequence is used:
1) ADD AX,BX
2) MOV/CX,AX Result forwarding modifies the MOV command such that the CX register is loaded with the data generated as the result of the ADD instruction. As shown in FIG. 16a (assuming that physical register "0" is allocated to logical source register BX, physical register "1" is allocated to logical source register AX, physical register "2" is allocated to logical destination register AX and physical register "3" is allocated to logical destination register CX), there exists a RAW dependency between the two instructions, since the destination of the ADD instruction (physical register 2) is the source of the MOV instruction.

After result forwarding (FIG. 16b), the ADD instruction remains unchanged; however the residual control word associated with the MOV instruction is modified such that the destination register CX (physical register 3) receives its data from the write-back bus associated with the EX unit performing the ADD (shown in FIG. 16b as the X-side write-back bus) at the same time AX is written. Consequently, the RAW dependency is eliminated, and both the ADD and the MOV instructions may be executed simultaneously.

Forwarding is used under certain conditions only. One of the instructions in the sequence must be a MOV instruction or similar "non-working" instruction. A non-working instruction is one that transfers operand data from one location to another, but does not perform substantive operations on the data. A working instruction generates new data in response to operand data or modifies operand data. In the X86 instruction set, the non-working instructions would include MOV, LEA, PUSH <reg>, and POP <reg>. Also, OR <reg1>,<reg1>and AND <reg1>,<reg1>(where both the source and destination registers are the same) can be considered "non-working" instructions because they are used only to set flags.

Further, in the preferred embodiment, forwarding is used only in cases where both instructions in the sequence are in their respective EX units at the same clock cycle. Forwarding searches up to three instructions (in program order) ahead of an instruction in the AC2 stage to determine whether a forwarding case can occur. Even if the forwarding instruction is two instructions ahead, forwarding can occur if the forwarding instruction delays in the EX stage long enough for the instruction in the AC2 stage to move to the EX stage.

Figure 17A:
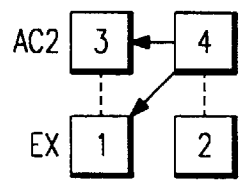
FIGS. 17*a* and 17*b* illustrate the detection of forwarding situations.

As shown in FIG. 17a, in the situation where instructions "1" and "2" are in the X- and Y-side EX units, respectively, and instructions "3" and "4" are in the X- and Y-side AC2 units, instruction "4" looks at instructions "3" and "1" to determine whether an operand or result forwarding situation is possible. Since instruction "4" is still in the AC2 stage, it cannot forward with instruction "1" unless instruction "1" delays in the EX stage until instruction "4" is issued into the Y-side EX stage. Similarly, if a forwarding situation is possible with instruction "3", the forwarding will occur only if both "3" and "4" are issued to the respective EX stages such that they are concurrently in the EX stage for at least one clock cycle. Instruction "4" does not look to instruction "2" for a forwarding situation, since both instructions cannot be concurrently in the EX unit given the architecture shown. Bypassing may be used to reduce the latency period of RAW dependencies between instruction "4" and "2". With alternative pipeline configurations, such as an architecture which allowed switching pipes at the AC2/EX boundary, it would be possible to forward between instruction "4" and "2".

Figure 17B:
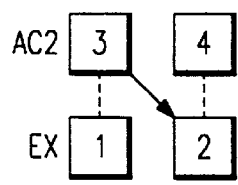

FIG. 17b illustrates the conditions monitored for forwarding in connection with instruction "3" given the initial conditions set forth in connection with FIG. 17a. In this state, only instruction "2" is monitored for a forwarding situation. Instruction "1" cannot forward with instruction "3" because they cannot concurrently be in the EX stage. Instruction "3" cannot have a RAW dependency on instruction "4" because instruction "4" is junior to instruction "3" (although, as shown in FIG. 17a, instruction "4" can have a RAW dependency on instruction "3").

Figure 18:
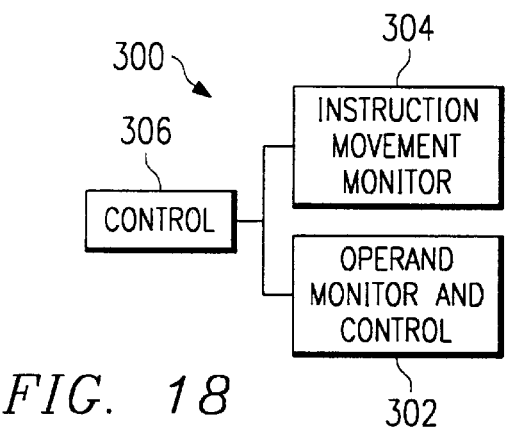
FIG. 18 is a block diagram of the forwarding circuitry.

A block diagram of the forwarding control circuitry is shown in FIG. 18. The circuitry of the forwarding control stage is associated with the AC2 stage. The forwarding control circuitry 300 includes operand monitor and control circuitry 302 to monitor the source operands of the instructions in the AC2 pipe stage and the source and destination operands of the instructions in the EX stage and to modify the residual control information as described above. Further, once the possibility of a forwarding situation is detected, instruction movement monitoring circuitry 304 of the forwarding control circuitry 300 monitors movements of the instructions to detect the presence of both instructions in the respective EX units to implement forwarding. Control circuitry 306 coordinates the operand monitor and control circuitry 302 and instruction movement monitor circuitry 304. In the preferred embodiment, the forwarding circuitry is part of the register file control found in the physical register circuitry 24 (FIG. 1a). The register file control also maintains the residual control words.

While forwarding has been discussed in relation to a processor using two instruction pipelines, it could be similarly used in connection with any number of pipelines. In this case, the forwarding control circuitry would monitor the residual control words associated with instructions in the EX units of each of the pipelines at the EX and AC2 stages.

Forwarding and register translation are independent of one another. In a given microprocessor, either or both techniques can be used to increase instruction throughput.

10. Conclusion

While the present invention has been described in connection with a specific embodiment of two pipelines with specific stages, it should be noted that the invention, as defined by the claims, could be used in connection with more than two pipelines and different stage configurations.

The pipe control unit disclosed herein provides an efficient flow of instructions through the pipeline, which increases the rate at which the instructions are processed. Hence, a higher instruction throughput can be achieved without resort to higher frequencies. Further, the register translation unit and forwarding eliminate many dependencies, thereby reducing the need to stall instructions.

Although the Detailed Description of the invention has been directed to certain exemplary embodiments, various modifications of these embodiments, as well as alternative embodiments, will be suggested to those skilled in the art. For example, while various methods and circuits for pipeline control have been illustrated in conjunction with one another, independent use one or more of the various methods and circuits will generally lead to beneficial results.

The invention encompasses any modifications or alternative embodiments that fall within the scope of the Claims.

What is claimed is:

1. A pipelined processor having an execution pipeline that processes at least some instructions that reference a set of logical registers, comprising:
   (a) the execution pipeline including at least (i) an instruction decode stage, (ii) an execution stage, (iii) pipeline control circuitry, and (iv) microcontrol circuitry, wherein at least some of the instructions that reference the logical registers are microcontrolled instructions;
   (b) the microcontrol circuitry providing, for each of the microcontrolled instructions, one or more microinstructions controlling execution of the microcontrolled instruction in the execution stage of the execution pipeline;
   (c) a register file with a plurality of physical registers for storing information associated with the logical registers; and
   (d) register translation circuitry that allocates physical registers in the register file to the logical registers, the register translation circuitry being controllable either by (i) hardware control signals generated by the instruction decode stage or the pipeline control circuitry, or (ii) for a predetermined type of microcontrolled instruction, microcode control signals generated by one or more microinstructions associated with the predetermined type of microcontrolled instruction;
   (e) for each of the predetermined type of microcontrolled instruction, the microcontrol circuitry provides the microcode control signals to the register translation circuitry during execution of such predetermined type of microcontrolled instruction.

2. The pipelined processor of claim 1 wherein the register translation circuitry further comprises:
   a multiplexer that selects, in response to a microcode select signal from the microcontrol circuitry, between (i) the hardware control signals, and (ii) the microcode control signals.

3. The pipelined processor of claim 2 wherein the microcode select signal comprises one or more microcode select bits in a microinstruction.

4. The pipelined processor of claim 1 wherein the pipelined processor includes at least two execution pipelines, and wherein the predetermined type of microcontrolled instruction comprise exclusive microcontrolled instructions each of which is issued alone into the at least two execution pipelines without being paired with another instruction.

5. In a pipelined processor having an execution pipeline that processes at least some microcontrolled instructions that reference a set of logical registers, the execution pipeline including at least an instruction decode stage, an execution stage, and pipeline control circuitry, a method of controlling register translation hardware to map the logical registers into a plurality of physical registers in a register file, comprising the steps:

(a) providing, for each of the microcontrolled instructions, one or more microinstructions controlling execution of the microcontrolled instruction in the execution stage of the execution pipeline;

(b) allocating physical registers in the register file to the logical registers in response to either (i) hardware control signals generated by the instruction decode stage or the pipeline control circuitry, or (ii) for a predetermined type of microcontrolled instruction, microcode control signals generated by one or more microinstructions associated with the predetermined type of microcontrolled instruction; and (c) for each of the predetermined type of microcontrolled instruction, providing the microcode control signals to control the allocation of physical registers in step (b).

6. The method of controlling register translation hardware of claim 5 wherein step (c) is accomplished by using one or more microcode select bits in a microinstruction.

7. The method of controlling register translation hardware of claim 5 wherein the pipelined processor includes at least two execution pipelines, and wherein the predetermined type of microcontrolled instruction comprise exclusive microcontrolled instructions each of which is issued alone into the at least two execution pipelines without being paired with another instruction.

* * * * *